US008572368B1

(12) United States Patent
Deacon (10) Patent No.: US 8,572,368 B1
(45) Date of Patent: Oct. 29, 2013

(54) SYSTEMS AND METHODS FOR GENERATING CODE-SPECIFIC CODE-SIGNING CERTIFICATES CONTAINING EXTENDED METADATA

(75) Inventor: William Deacon, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 66 days.

(21) Appl. No.: 13/243,047

(22) Filed: Sep. 23, 2011

(51) Int. Cl.
*H04L 29/06* (2006.01)
(52) U.S. Cl.
USPC ............................................... 713/158
(58) Field of Classification Search
USPC ............................................... 713/158
See application file for complete search history.

(56) References Cited

U.S. PATENT DOCUMENTS

| 5,892,904 A | 4/1999 | Atkinson et al. | |
|---|---|---|---|
| 2004/0025022 A1 | 2/2004 | Yach et al. | |
| 2004/0153644 A1* | 8/2004 | McCorkendale et al. | .... 713/156 |
| 2006/0156008 A1* | 7/2006 | Frank | ............................. 713/176 |
| 2006/0272026 A1* | 11/2006 | Niwano et al. | ................... 726/27 |
| 2007/0240194 A1* | 10/2007 | Hargrave et al. | .................... 726/1 |
| 2009/0249071 A1* | 10/2009 | De Atley et al. | ............... 713/171 |
| 2009/0249075 A1 | 10/2009 | De Atley et al. | |

OTHER PUBLICATIONS

William Deacon; Systems and Methods for Providing Digital Certificates That Certify the Trustworthiness of Digitally Signed Code; U.S. Appl. No. 13/243,116, filed Sep. 23, 2011.
Ieblog; "Stranger Danger"—Introducing SmartScreen Application Reputation; http://blogs.msdn.com/b/ie/archive/2010/10/13/stranger-danger-introducing-smartscreen-application-reputation.aspx; Oct. 13, 2010.

* cited by examiner

*Primary Examiner* — Matthew Smithers
(74) *Attorney, Agent, or Firm* — ALG Intellectual Property, LLC (57) ABSTRACT

A computer-implemented method for generating code-specific code-signing certificates may include (1) receiving a code-signing request from a software publisher to sign code, the code-signing request including both information that uniquely identifies the code and metadata that identifies at least one characteristic of the code, (2) signing the code by generating a unique, code-specific digital certificate for the code that is valid only for the code in question and includes at least a portion of the metadata contained within the code-signing request, and then (3) providing the code-specific digital certificate to the software publisher to enable the software publisher to attest that the code originated from the software publisher and has not been altered since leaving the software publisher's possession. Various additional methods, systems, and encoded computer-readable media are also disclosed.

20 Claims, 7 Drawing Sheets

SYSTEMS AND METHODS FOR GENERATING CODE-SPECIFIC CODE-SIGNING CERTIFICATES CONTAINING EXTENDED METADATA

BACKGROUND

Many software publishers digitally "sign" files or applications created or published by the publisher in order to demonstrate the authenticity of such files and applications. For example, a software publisher may digitally sign a file by encrypting a checksum or hash of the file using a public-key cryptographic system in order to enable recipients to verify that the file was both created by the publisher and has not been altered since leaving the publisher's possession.

Because malicious or unscrupulous individuals or entities may attempt to pose as respected software publishers when distributing files, a software publisher may also obtain, and include within all files that it subsequently publishes, a digital certificate from a well-known and/or trusted certificate authority that certifies that files signed by the publisher in fact originated from the publisher in question. Digital certificates, which are typically digitally signed by a trusted certificate authority using the certificate authority's private cryptographic key, attest that a particular public key belongs to an identified entity, thereby enabling recipients to verify that a digitally signed file in fact originated from a particular entity.

Unfortunately, current digital certificates fail to convey any useful information above and beyond the identity of the entity (or entities) that digitally signed the file in question. Moreover, because software publishers typically sign all files that they publish using the same digital certificate, if a certificate authority or software publisher ever needs to revoke a digital certificate, then all files that have been digitally signed using this digital certificate are also treated as revoked, even if only a single file signed using this digital certificate necessitated the revocation event. Accordingly, the instant disclosure identifies and addresses a need for improved systems and methods for generating and providing digital certificates.

SUMMARY

As will be described in greater detail below, the instant disclosure generally relates to systems and methods for generating code-specific code-signing certificates that both convey more information than traditional digital certificates and give software publishers and certificate authorities greater levels of control over the management and/or revocation of such certificates. In one example, a computer-implemented method for accomplishing such a task may include (1) receiving a code-signing request from a software publisher to sign code, the code-signing request including both information that uniquely identifies the code and metadata that identifies at least one characteristic of the code, (2) signing the code by generating a unique, code-specific digital certificate for the code that is valid only for the code in question and includes at least a portion of the metadata contained within the code-signing request, and then (3) providing the code-specific digital certificate to the software publisher to enable the software publisher to attest that the code originated from the software publisher and has not been altered since leaving the software publisher's possession.

In one example, the information that uniquely identifies the code may represent a copy of the code in question and/or a digital fingerprint that uniquely identifies the code in question. In one embodiment, the metadata included within the code-signing request may include information that identifies an application name associated with the code, a version number associated with the code, a content rating associated with the code, an application category associated with the code, and/or any other potentially relevant information. In some examples, the code-signing request may also include a request to prevent at least a portion of the metadata contained within the code-signing request from being included within the code-specific digital certificate.

In one example, the code-signing request may also include a publisher-defined validity period that specifies a limited period of time that the code-specific digital certificate is to be valid. In this example, the step of generating the code-specific digital certificate may involve including expiration data within the code-specific digital certificate that specifies that the code-specific digital certificate expires at the end of the publisher-defined validity period. In some embodiments, the code-specific digital certificate may also include a certificate extension that specifies that relying parties should not ignore the expiration data contained within the code-specific digital certificate, even if an otherwise valid timestamp is present. The code-specific digital certificate may also include information that identifies the software publisher, information that identifies an entity responsible for signing the code, a checksum of the code, and/or a digital signature created using a private key.

In some examples, the method may also include revoking the code-specific digital certificate to prevent relying parties from trusting the code associated with the code-specific digital certificate. In one embodiment, the step of revoking the code-specific digital certificate may include revoking the code-specific digital certificate in response to a revocation request from the software publisher. In another embodiment, the step of revoking the code-specific digital certificate may include (1) identifying criteria for identifying at least one digital certificate that is to be revoked, (2) determining that at least a portion of the metadata associated with the code-specific digital certificate satisfies the criteria, and then (3) revoking the code-specific digital certificate.

All or a portion of the above-described method may be performed by a computing device of the software publisher that initiated the code-signing request and/or a remote computing device operated by a code-signing service (such as, e.g., a certificate authority).

In one embodiment, a system for implementing the above-described method may include an intake module programmed to receive a code-signing request from a software publisher to sign code. As detailed above, this code-signing request may include (1) information that uniquely identifies the code and (2) metadata that identifies at least one characteristic of the code. The system may also include a signing module programmed to sign the code by generating a unique, code-specific digital certificate for the code that is valid only for the code in question and includes at least a portion of the metadata contained within the code-signing request. In addition, the system may include a delivery module programmed to provide the code-specific digital certificate to the software publisher to enable the software publisher to attest that the code originated from the software publisher and has not been altered since leaving the software publisher's possession. The system may also include at least one processor configured to execute the intake module, the signing module, and the delivery module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a code-signing request from a software publisher to sign code, the code-signing request including both information that uniquely identifies the code and metadata that identifies at least one characteristic of the code, (2) sign the code by generating a unique, code-specific digital certificate for the code that is valid only for the code in question and includes at least a portion of the metadata contained within the code-signing request, and then (3) provide the code-specific digital certificate to the software publisher to enable the software publisher to attest that the code originated from the software publisher and has not been altered since leaving the software publisher's possession.

As will be explained in greater detail below, by generating code-specific digital certificates that are only valid for a specific file or application, the systems and methods described herein may enable software publishers and certificate authorities to revoke a certificate associated with an individual file or application without also needlessly revoking the certificates associated with other valid files or applications. Moreover, by obtaining and including extended metadata within such single-use digital certificates, the systems and methods described herein may give relying parties, software publishers, and/or certificate authorities greater levels of insight and control over the management and/or revocation of such certificates.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
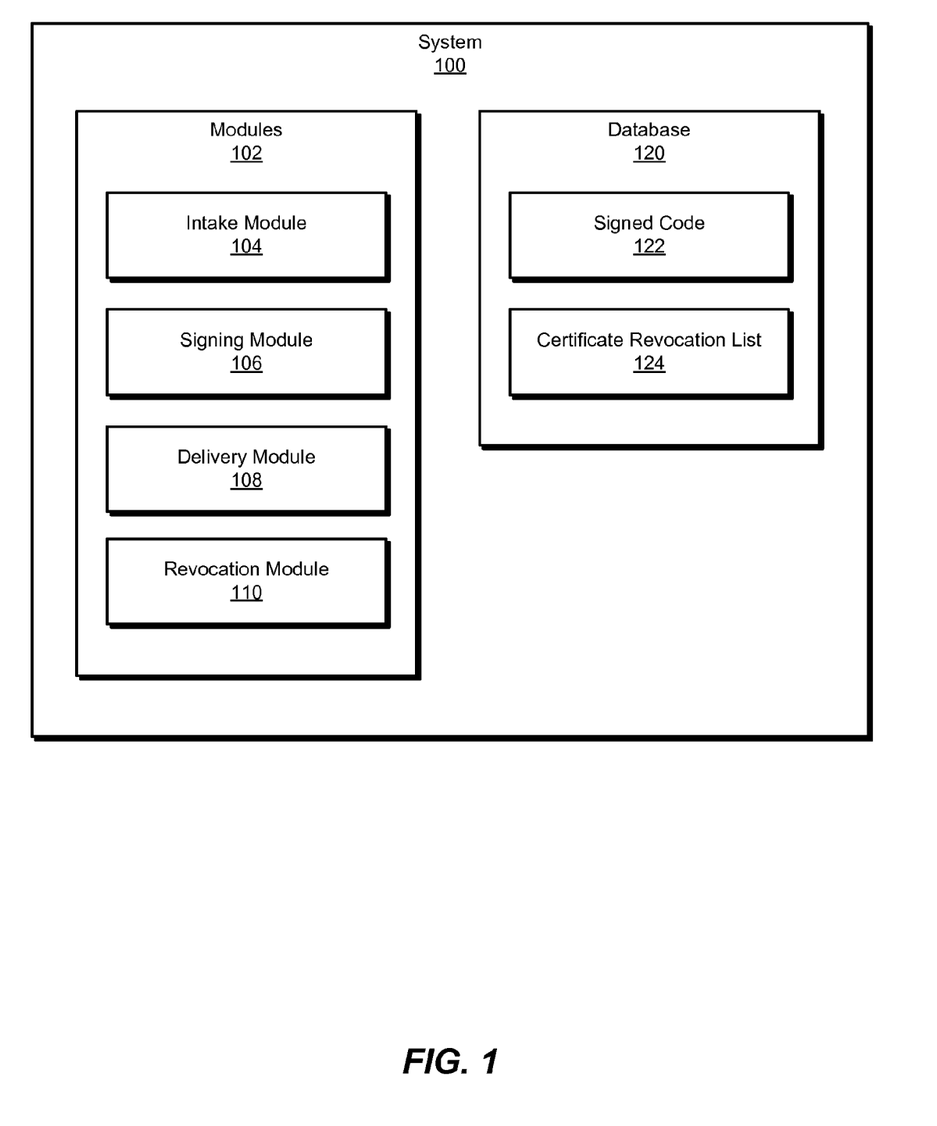
FIG. 1 is a block diagram of an exemplary system for generating code-specific code-signing certificates containing extended metadata.
Figure 2:
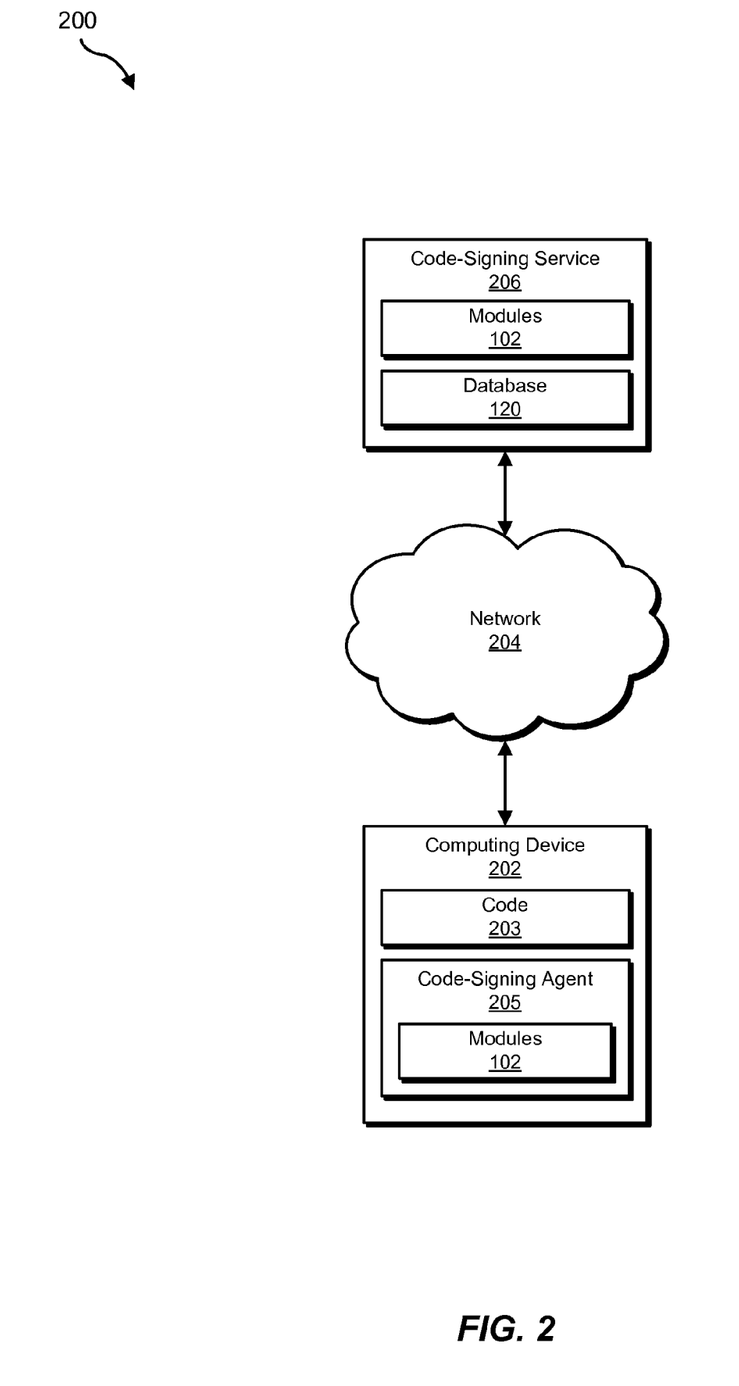
FIG. 2 is a block diagram of an exemplary system for generating code-specific code-signing certificates containing extended metadata.

The following will provide, with reference to FIGS. 1-2, detailed descriptions of exemplary systems for generating code-specific code-signing certificates containing extended metadata. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for generating code-specific code-signing certificates containing extended metadata. As illustrated in this figure, exemplary system 100 may include one or more modules 102 for performing one or more tasks. For example, and as will be explained in greater detail below, exemplary system 100 may include an intake module 104 programmed to receive a code-signing request from a software publisher to sign code. As will be explained in greater detail below, this code-signing request may include (1) information that uniquely identifies the code and (2) metadata that identifies at least one characteristic of the code. The system may also include a signing module 106 programmed to sign the code by generating a unique, code-specific digital certificate for the code that is valid only for the code in question and includes at least a portion of the metadata contained within the code-signing request.

In addition, the system may include a delivery module 108 programmed to provide the code-specific digital certificate to the software publisher to enable the software publisher to attest that the code in question originated from the software publisher and has not been altered since leaving the software publisher's possession. The system may also include a revocation module 110 programmed to revoke invalid code-specific digital certificates. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or code-signing service 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store both (1) copies and/or digital fingerprints of signed code 122 and (2) a certificate revocation list 124 that identifies invalid certificates. In some examples, database 120 may also store metadata associated with signed code 122.

Database 120 may represent portions of a single database or computing device or a plurality of databases or computing devices. For example, database 120 may represent a portion of code-signing service 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as code-signing service 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a code-signing service 206 via a network 204.

In one embodiment, one or more of modules 102 from FIG. 1 may, when executed by at least one processor of computing device 202, enable computing device 202 to generate code-specific code-signing certificates. For example, and as will be described in greater detail below, one or more of modules 102 may cause code-signing service 206 to (1) receive a code-signing request from a software publisher (from, e.g., computing device 202) to sign code (e.g., code 203), (2) sign the code by generating a unique, code-specific digital certificate for the code that is valid only for the code in question and includes at least a portion of the metadata contained within the code-signing request, and then (3) provide the code-specific digital certificate to the software publisher to enable the software publisher to attest that the code in question originated from the software publisher and has not been altered since leaving the software publisher's possession.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device. In one example, computing device 202 may be operated by a software developer or publisher.

In one example, computing device 202 may include a code-signing agent 205. As will be explained in greater detail below, in some examples code-signing agent 205 may, either alone or in combination with services provided by code-signing service 206, generate code-specific code-signing certificates. As with other aspects of system 200, code-signing agent 205 may be implemented using a wide range of hardware, software, or firmware (or any combination thereof) configurations (including, e.g., trusted hardware components).

Code-signing service 206 generally represents any type or form of computing device that is capable of generating code-specific digital certificates for code submitted for approval by software publishers. Examples of code-signing service 206 include, without limitation, application servers and database servers configured to provide various database services and/or run certain software applications. In one example, code-signing service 206 may be operated by a reputable or trusted entity, such as a certificate authority.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and code-signing service 206.

Figure 3:
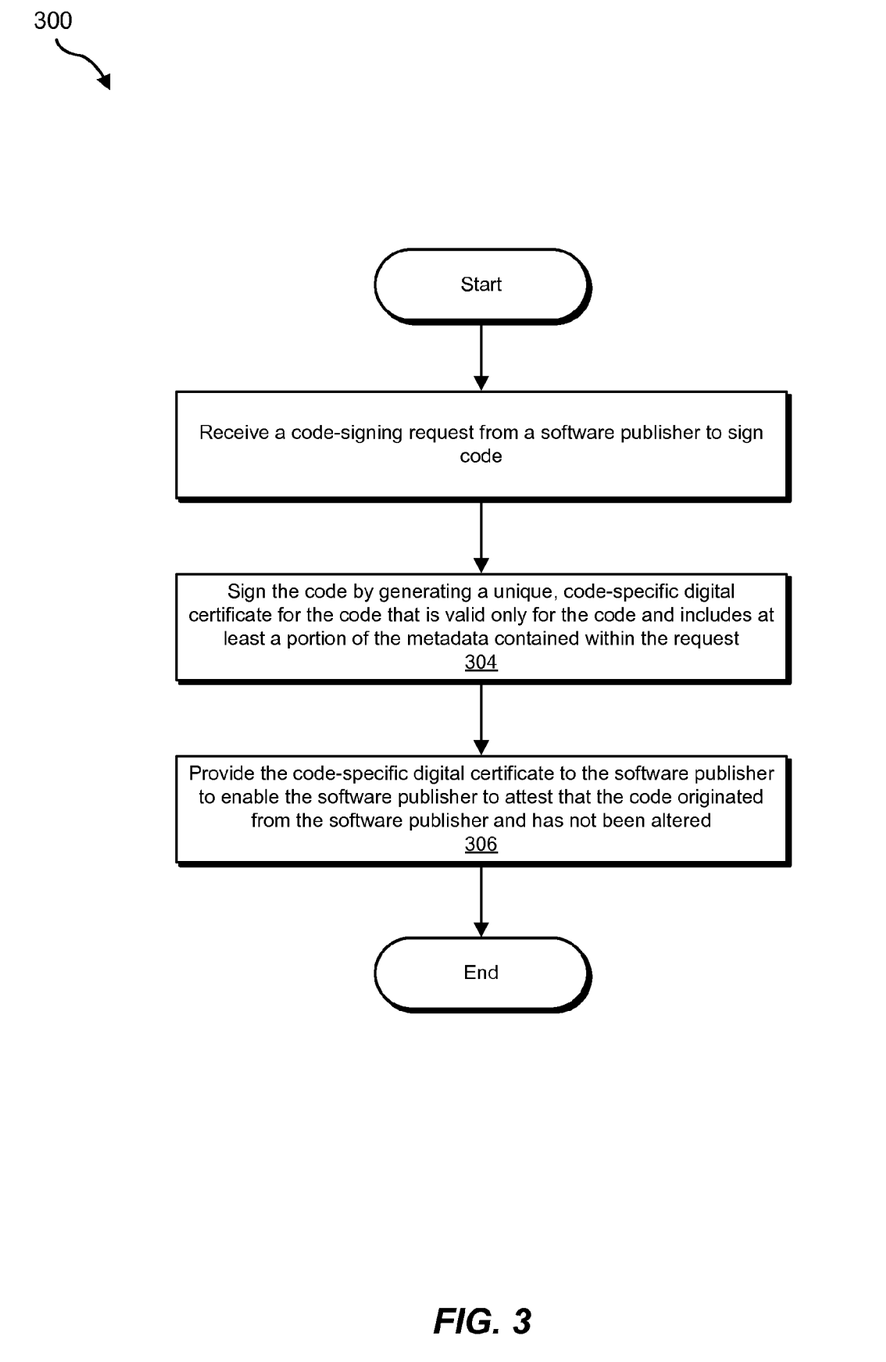
FIG. 3 is a flow diagram of an exemplary method for generating code-specific code-signing certificates containing extended metadata.

FIG. 3 is a flow diagram of an exemplary computer-implemented method 300 for generating code-specific code-signing certificates containing extended metadata. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 the systems described herein may receive a code-signing request from a software publisher to sign code. For example, intake module 104 may, as part of code-signing service 206 in FIG. 2, receive a request from a computing device 202 (which may, as detailed above, be operated by a software publisher) to sign code 203.

The term "software publisher," as used herein, generally refers to any entity that is capable of generating and/or distributing code. Examples of software publishers include, without limitation, software developers (i.e., individuals or entities responsible for generating or creating software applications), content providers (i.e., individuals or entities responsible for generating or creating digital content), distributors of software or content (i.e., individuals or entities that distribute or publish software applications or content created by others), or the like.

In addition, the term "code," as used herein, generally refers to any type or form of computer-readable instruction that is capable of being digitally signed. Examples of such code include, without limitation, executable files, data files, digital content (e.g., audio files, image files, video files, etc.), or any other computer-readable object that is capable of being digitally signed.

In some examples, the code-signing request received in step 302 may include information that uniquely identifies the code in question. In one example, this information may simply represent a full copy of the code in question. In another example, this information may represent a digital fingerprint that uniquely identifies the code in question (e.g., a hash or other function that maps a full copy of the code to a smaller data object that uniquely identifies the code). In this example, the use of a digital fingerprint (as opposed to a full copy of the code) may preserve network bandwidth during transmission of the code-signing request and may enable software publishers to avoid exposing valuable and/or sensitive code to others.

In one embodiment, the code-signing request may also contain a digital signature that verifies the integrity of the code in question. The phrase "digital signature," as used herein, generally refers to any type or form of mathematical scheme for demonstrating the authenticity of a digital object. In one example, a software publisher may generate such a digital signature by (1) generating a checksum or hash of the code in question (or of the digital fingerprint of the code in question) and then (2) encrypting this checksum using a private cryptographic key.

In the above example, code-signing service 206 may validate the digital signature contained within the code-signing request by (1) calculating a checksum or hash of the copy of code 203 contained within the code-signing request (or of the digital fingerprint of code 203 contained within the code-signing request), (2) decrypting, using a public cryptographic key associated with the software publisher, the digital signature contained within the code-signing request in order to obtain an expected checksum, and then (3) determining that the expected checksum matches the calculated checksum.

Validating the digital signature in this manner may verify that the copy of code 203 contained within the code-signing request has not been modified or tampered with since leaving the possession of the software publisher.

In some examples, the code-signing request may also include metadata that identifies at least one characteristic of the code contained within the code-signing request. Examples of the types of characteristics that may be identified within this metadata include, without limitation, an application name associated with the code (e.g., "UtilityPro"), a version number associate with the code (e.g., "Version 3.72"), a content rating associated with the code (e.g., an industry-standard rating, such as those used by the music, movie, TV, and/or game industry, or a simple generic designation, such as "All Ages," "Teen," or the like), an application category associated with the code (e.g., a category that indicates a genre that the code falls within, such as "Game," "Education," "Financial," "Utility," or the like), and/or any other potentially relevant information.

Figure 4:
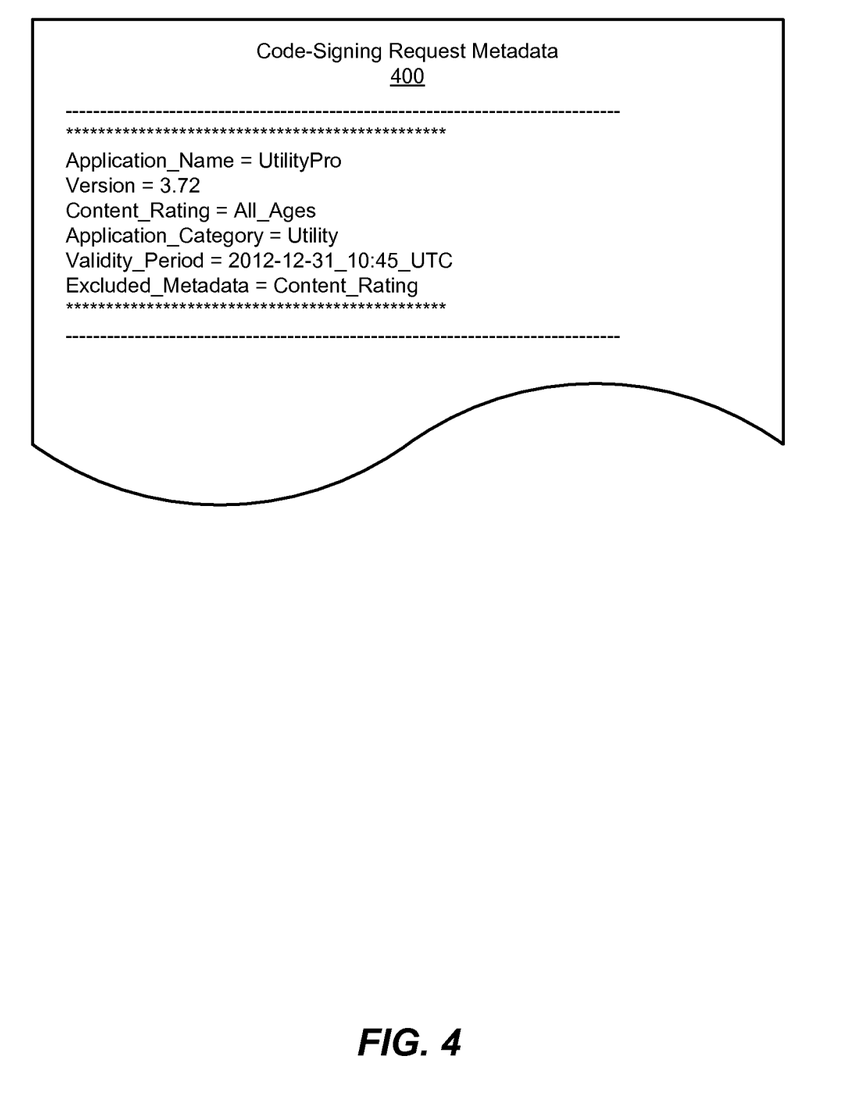
FIG. 4 is an exemplary illustration of metadata that may be included within a code-signing request.

FIG. 4 contains an illustration of exemplary metadata 400 that may be included within a code-signing request. As illustrated in this figure, metadata 400 may identify the name of the code in question ("UtilityPro"), the version number of the code in question ("3.72"), a content rating associated with the code in question ("All_Ages"), and a category associated with the code in question ("Utility").

In some examples, the code-signing request received in step 302 may also include a request from the software publisher to prevent at least a portion of the metadata included within the code-signing request from being included within the digital certificate that is to be created for the code in question (the creation process for which will be explained in greater detail below). For example, metadata 400 may include a request to exclude the field "Content_Rating" and its associated entry "All_Ages" from the digital certificate that is to be created for the code in question. In this example, the systems described herein may provide or enable software publishers to exclude unnecessary or undesirable metadata from being included within (and thus made publically available by) digital certificates created for their code.

In one embodiment, the code-signing request received in step 302 may also include a publisher-defined validity period that specifies a limited period of time that the requested digital certificate is to be valid. For example, a software publisher may specify, within the field "Validity_Period" in metadata 400, that the digital certificate that is to be created for the code in question should expire on "2012 Dec. 13" at "10.45 UTC."

In some embodiments, the systems described herein may perform step 302 as part of a computing device operated by the software publisher that initiated the code-signing request and/or as part of a remote computing device operated by a code-signing service (such as, e.g., a certificate authority). For example, in one embodiment intake module 104 may, as part of code-signing service 206 in FIG. 2, receive a request to sign code 203 from a remote computing device (e.g., computing device 202) via network 204. In another example, intake module 104 may, as part of code-signing agent 205 on computing device 202, receive a request from a user or application of computing device 202 to sign code 203 located on computing device 202. In either example, a software publisher may generate the code-signing request by interacting with a graphical user interface provided by one or more of modules 102.

Returning to FIG. 3, at step 304 the systems described herein may, in response to the code-signing request received in step 302, sign the code in question by generating a unique, code-specific digital certificate for the code that is valid only for the code in question and includes at least a portion of the metadata contained within the code-signing request. For example, signing module 106 may, as part of code-signing service 206 in FIG. 2, sign code 203 by generating a unique, code-specific digital certificate for code 203.

The phrase "digital certificate" (or simply "certificate"), as used herein, generally refers to an electronic document issued by a code-signing service (such as a certificate authority) that attests that the code in question originated from (i.e., was created or published) by a particular entity and has not been altered since leaving the possession of that entity. In addition, the phrase "code-specific digital certificate" may refer to unique digital certificates that may only be used in connection with (i.e., digital certificates that are valid only for) a specific file or application.

Code-specific digital certificates may take a variety of forms and may include a variety of information. In some examples, the code-specific digital certificate generated in step 304 may include (1) information that uniquely identifies a publisher of the code in question (using, e.g., the distinguished name of the publisher), (2) information that uniquely identifies the code-signing service or certificate authority responsible for generating the certificate (using, e.g., the distinguished name of the code-signing service or certificate authority), (3) a hash or checksum of the code in question, and/or (4) a digital signature generated by the code-signing service or certificate authority. In some examples, this code-specific digital certificate may also include at least a portion of the metadata contained within the code-signing request received in step 302 (e.g., the name or version number of the code, a content rating or application category associated with the code, and/or expiration data that specifies the publisher-defined validity period specified in the code-signing request). In one example, this additional information may be included as metadata within a certificate extension within the code-specific digital certificate.

Figure 5:
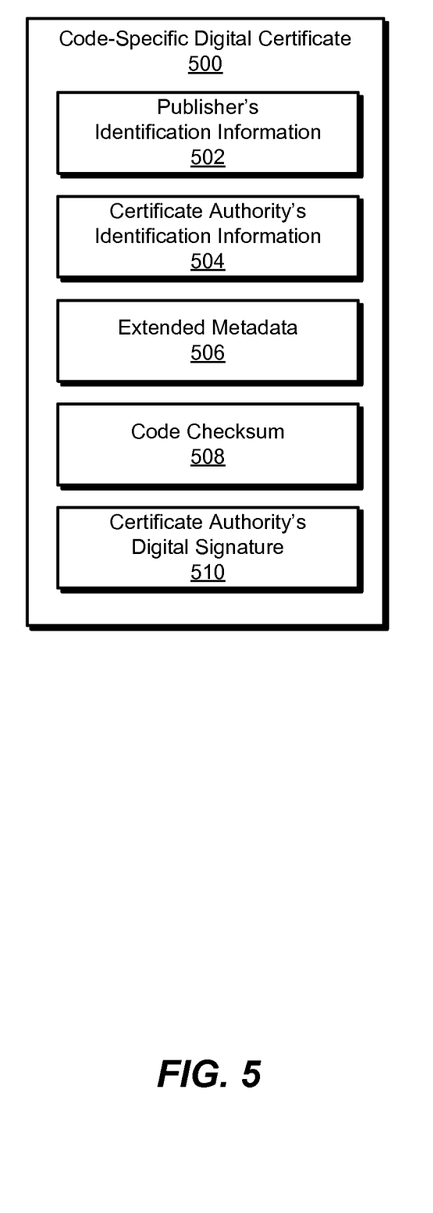
FIG. 5 is an illustration of an exemplary code-specific digital certificate.

Code-specific digital certificate 500 in FIG. 5 is an illustration of an exemplary code-specific digital certificate. As illustrated in this figure, exemplary code-specific digital certificate 500 may include (1) publisher identification information 502 (which may include the distinguished name of the publisher of the code in question), (2) certificate authority identification information 504 (which may include the distinguished name of the code-signing service or certificate authority that created certificate 500), (3) extended metadata 506 (which may represent one or more certificate extensions that include at least a portion of the metadata contained within the code-signing request received in step 302, such as the name or version number of the code, a content rating or application category associated with the code, and/or expiration data that specifies the publisher-defined validity period specified in the code-signing request), (4) a checksum or hash 508 of the code, and (5) a digital signature 510. In one example, the certificate authority responsible for generating code-specific digital certificate 500 may digitally sign certificate 500 by hashing all or a portion of the information contained within certificate 500 (e.g., publisher identification information 502, certificate authority identification information 504, extended metadata 506, and/or checksum 508) and then encrypting the same using a private cryptographic key, resulting in digital signature 510.

In some examples, the private key used by the certificate authority to digitally sign code-specific digital certificate 500 may represent the private-key portion of an asymmetric key pair that was created specifically for, and that is unique to, the code in question. For example, signing module 106 may create a new asymmetric key pair for each code-signing request that it receives. In this example, by signing each code object using a new asymmetric key pair that is unique to the code in question, signing module 106 may create a digital certificate that represents a unique, code-specific certificate that is valid only for the code in question.

In other examples, the private key used by the certificate authority to digitally sign code-specific digital certificate 500 may represent the private-key portion of an asymmetric key pair that was created specifically for, and that is unique to, a family of code (such as all versions of a particular application). For example, signing module 106 may create a new asymmetric key pair for each application (including all versions of the application) that is to be signed. In this example, by signing each version of an application using the asymmetric key pair that is unique to the application, signing module 106 may create a digital certificate that represents an application-specific certificate that is valid only for the various versions of the application in question. This application-specific certificate may, in turn, enable software publishers, certificate authorities, and/or third parties (e.g., security-software vendors) to easily track and/or monitor various aspects of the application in question (such as, e.g., the reputation of the application).

In some examples, signing module 106 may include the public-key portion of the asymmetric key pair used to digitally sign the digital certificate within the digital certificate itself (e.g., within code-specific digital certificate 500 in FIG. 5) to enable relying parties to decrypt the digital signature contained within the code-specific digital certificate in order to verify the integrity of its contents. In one embodiment, code-signing module 106 may also dispose of the private key used to digitally sign the code-specific digital certificate to ensure that this private key is never compromised.

As detailed above, in some examples the code-specific digital certificate created in step 304 may include expiration data that specifies that the code-specific digital certificate expires at the end of the publisher-defined validity period specified within the code-signing request received in step 302. Because many relying parties ignore the expiration data contained within conventional digital certificates if a valid timestamp is present, in some examples the systems described herein may also include a certificate extension within the code-specific digital certificate that specifies that relying parties should not ignore the expiration data contained within the code-specific digital certificate (even if, e.g., an otherwise valid timestamp is present). For example, signing module 106 may include a certificate extension within code-specific digital certificate 500 (e.g., as part of extended metadata 506) that specifies that relying parties should not ignore the expiration data contained within code-specific digital certificate 500.

In the above example, by providing a certificate extension that specifies an absolute expiration date for the code-specific digital certificate, the systems described herein may enable software publishers to assign individual validity periods to specific applications or versions of applications in order to enable trial periods or limit-use applications.

If the certificate authority responsible for creating the code-specific digital certificate chooses to act as a root certificate authority, the certificate authority may authenticate the software publisher prior to issuing the certificate to the same by, for example, (1) requesting, either from the publisher or from an additional source, additional information regarding the identity of the publisher (i.e., information that may be used to authenticate the publisher, such as information that may be used identify the size of the publisher, how long the publisher has been in operation, annual revenues of the publisher, the number of applications or files of the publisher that are in circulation, whether the publisher has been known to generate malware, or the like), (2) requesting information regarding code published by the publisher (e.g., information that may be used to determine the nature and purpose of files or applications published by the publisher), and/or (3) requesting a certification fee from the publisher.

As with prior steps, the systems described herein may perform step 304 as part of a computing device operated by the software publisher that initiated the code-signing request and/or as part of a remote computing device operated by a code-signing service (such as, e.g., a certificate authority). For example, signing module 106 may sign code 203 as part of code-signing agent 205 on computing device 202 in FIG. 2. In this example, code-signing agent 205 may either sign code 203 on its own or in combination with services performed by code-signing service 206. In another example, signing module 106 may sign code 203 as part of code-signing service 206.

Returning to FIG. 3, at step 306 the systems described herein may provide the code-specific digital certificate generated in step 304 to the software publisher to enable the software publisher to attest that the code in question originated from the software publisher and has not been altered since leaving the software publisher's possession. For example, delivery module 108 may, as part of code-signing service 206 in FIG. 2, provide code-specific digital certificate 500 for code 203 to computing device 202 (which may, as detailed above, be operated by a software publisher).

As detailed above, the code-specific digital certificate created in step 304 may attest that the code in question was both created by a particular entity and has not been altered since leaving the possession of that entity. In some examples, relying parties may validate the code-specific digital certificate prior to relying on the same. For example, a relying party may validate code-specific digital certificate 500 in FIG. 5 by (1) calculating a hash of the contents of certificate 500, (2) decrypting the certificate authority's digital signature 510 using a public key associated with (or provided by) the certificate authority in order to obtain an expected hash, and then (3) determining that the calculated hash matches the expected hash. Validating code-specific digital certificate 500 in this manner may verify that code-specific digital certificate 500 has not been modified or tampered with since it was created by the certificate authority. In turn, the verified information contained within code-specific digital certificate 500 may certify that the code in question was in fact created by the software publisher identified in publisher identification information 502 and has not been modified or tampered with since leaving the possession of the software publisher.

Upon completion of step 306, the logical flow of exemplary method 300 in FIG. 3 may terminate.

In some examples, the systems described herein may need to revoke a code-specific digital certificate created in accordance with exemplary method 300. For example, a software publisher, certificate authority, and/or third-party (such as a security-software vendor) may determine that code that was previously signed using a code-specific digital certificate created in accordance with the above-described method contains malware, bugs, and/or vulnerabilities. In this example, revocation module 110 may revoke the code-specific digital certificate associated with the code in question to prevent relying parties from trusting this code.

Revocation module 110 may revoke code-specific digital certificates in a variety of ways. In one example, revocation module 100 may add the code-specific digital certificate in question to a certificate revocation list (e.g., certificate revocation list 124 in FIG. 1) maintained by code-signing service 206. Code-signing service 206 may then immediately publish an updated version of certificate revocation list 124 and/or publish an updated version of certificate revocation list 124 in accordance with a predefined publishing schedule in order to inform relying parties that the certificate in question is no longer valid. In another example, revocation module 110 may make the revoked status of a code-specific digital certificate known via a protocol or service, such as the Online Certificate Status Protocol (OCSP).

In some examples, revocation module 110 may revoke a code-specific digital certificate in response to a request from a software publisher to revoke the certificate due to, for example, the software publisher discovering a bug or other vulnerability in the code associated with the certificate. In other examples, revocation module 110 may revoke a code-specific digital certificate in response to a request from a certificate authority and/or third party (e.g., a security-software vendor) to revoke the certificate due to, for example, the certificate authority and/or third party discovering malware and/or other vulnerabilities in the code associated with the certificate.

In some embodiments, the above-described revocation request received by revocation module 110 may represent a request to revoke a specific code-specific digital certificate. For example, a software publisher and/or third-party may submit a request to code-signing service 206 to revoke the code-specific digital certificate associated with a specific version of an application (e.g., "Version 3.72 of UtilityPro").

In other embodiments, the revocation request may represent a request to revoke all code-specific digital certificates that satisfy specific criteria. For example, a software publisher and/or third-party may submit a request to code-signing service 206 to revoke (1) all code-specific digital certificates associated with a particular software publisher (e.g., "ExampleCorp."), (2) all code-specific digital certificates associated with a particular application (e.g., "UtilityPro"), (3) all code-specific digital certificates associated with specific versions of an application (e.g., "Versions 2.x-3.x of UtilityPro"), and/or (4) all code-specific digital certificates associated with specific content or application categories created by a software publisher (e.g., "all adult content created by ExampleCorp." or "all utility applications created by ExampleCorp."). The specific criteria included within such a revocation request may follow any of a variety of formats and may be based on any of a variety of combinations of metadata (contained, e.g., either within the code-specific digital certificate itself or within a database, such as database 120, that stores metadata obtained from code-signing requests).

In the above example, revocation module 110 may, upon receiving a revocation request, (1) identify criteria within the revocation request for identifying the code-specific digital certificate(s) that are to be revoked, (2) identify metadata associated with previously signed code that satisfies the criteria contained within the revocation request, and then (3) revoke the code-specific digital certificate(s) associated with the signed code in question.

As explained above, by generating code-specific digital certificates that are only valid for a specific file or application, the systems and methods described herein may enable software publishers and certificate authorities to revoke a certificate associated with an individual file or application without also needlessly revoking the certificates associated with other valid files or applications. Moreover, by obtaining and including extended metadata within such single-use digital certificates, the systems and methods described herein may give relying parties, software publishers, and/or certificate authorities greater levels of insight and control over the management and/or revocation of such certificates.

Figure 6:
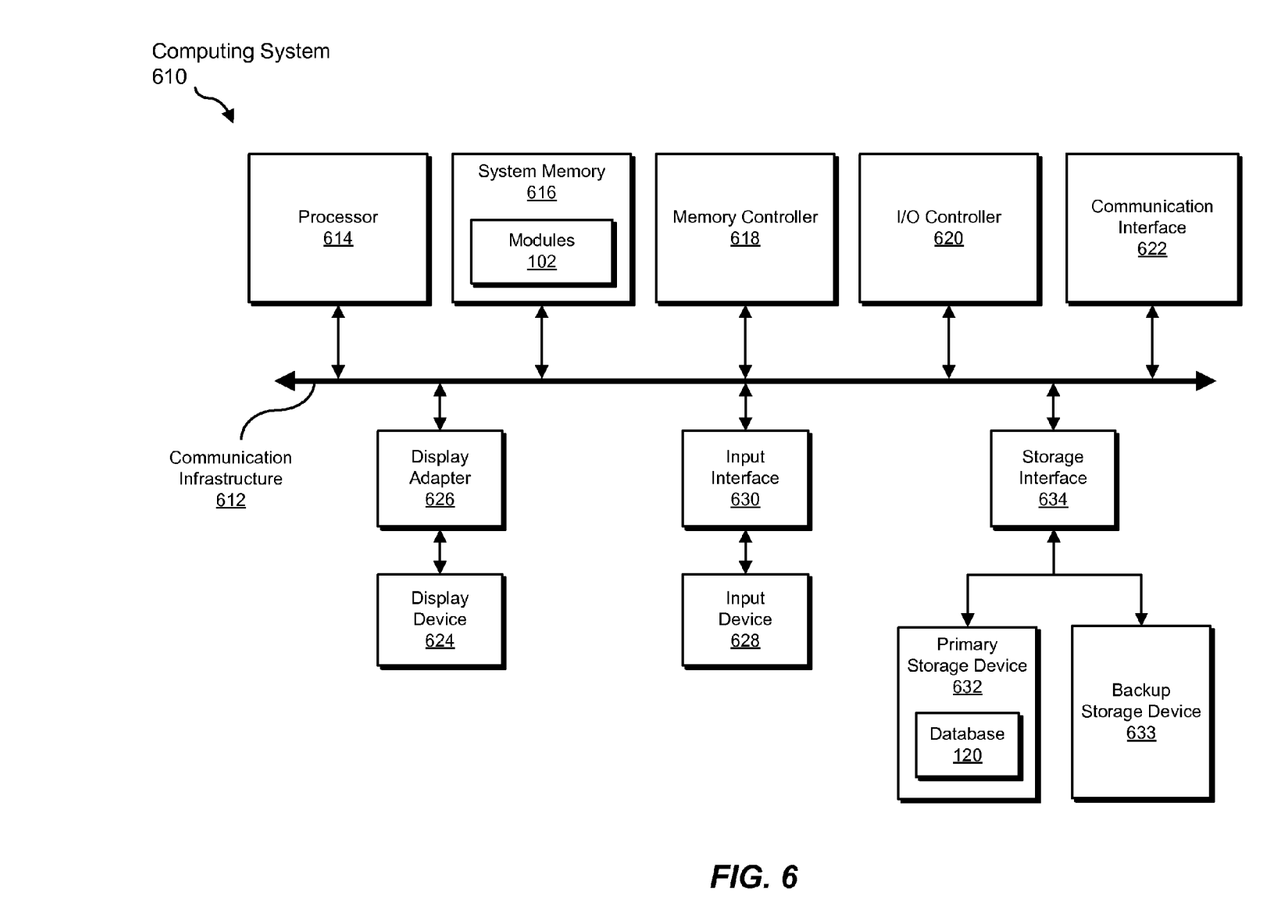
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 410 may perform and/or be a means for performing, either alone or in combination with other elements, one or more of the receiving, signing, providing, generating, including, revoking, identifying, and determining steps described herein. All or a portion of computing system 410 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network. In some examples, communications generated via communication infrastructure 612 may be secured. That is, communication interface may authenticate and/or encrypt all communications between components transmitted via communication infrastructure 612.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In some examples, communications generated via communication interface 622 may be secured. That is, communication interface may authenticate and/or encrypt all communications between computing system 610 and one or more additional devices.

In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
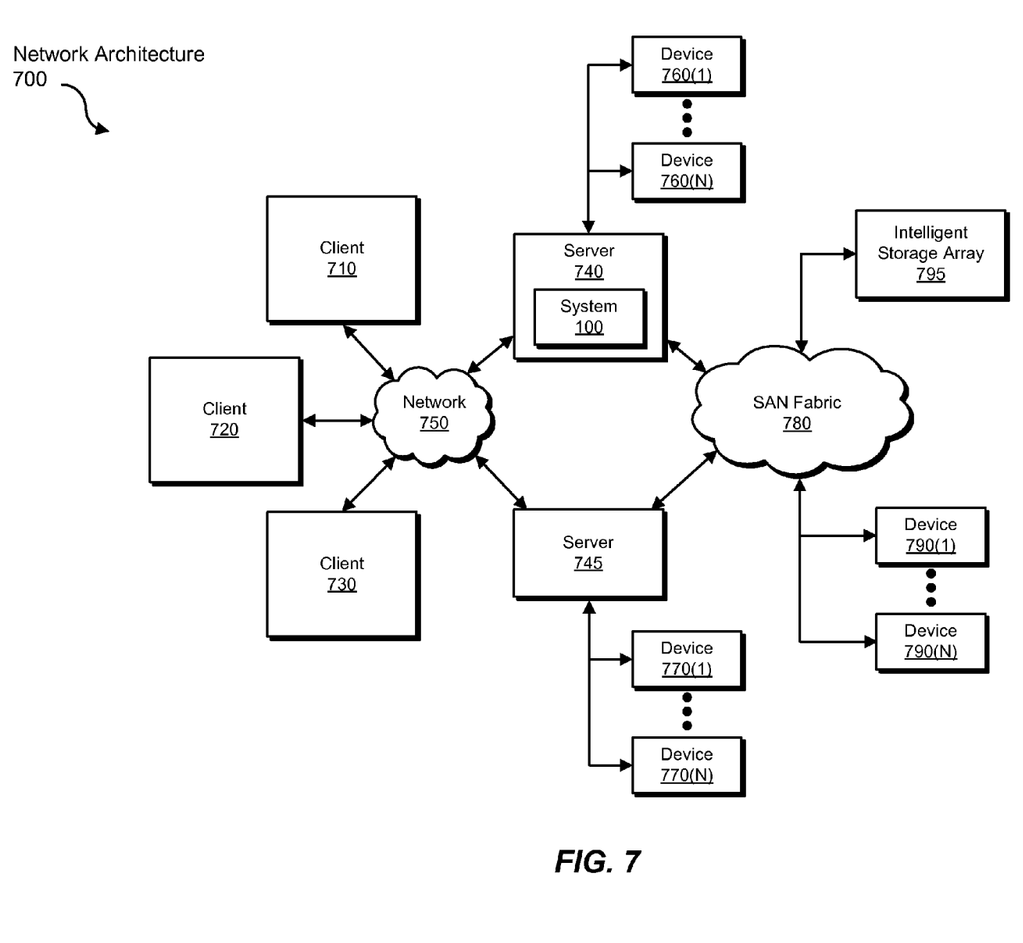
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the receiving, signing, providing, generating, including, revoking, identifying, and determining steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for generating code-specific code-signing certificates containing extended metadata.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform computing device 202 and/or code-signing service 206 in FIG. 2 into a device that is capable of generating code-specific code-signing certificates containing extended metadata.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for generating code-specific code-signing certificates containing extended metadata, at least a portion of the method being performed by a computing system comprising at least one processor, the method comprising:
   receiving a code-signing request from a software publisher to sign code, the code-signing request comprising:
      information that uniquely identifies the code;
      metadata that identifies at least one characteristic of the code;
   in response to the code-signing request, signing the code by generating a unique, code-specific digital certificate for the code, wherein the code-specific digital certificate is valid only for the code in question and includes at least a portion of the metadata contained within the code-signing request;
   providing the code-specific digital certificate to the software publisher to enable the software publisher to attest that the code originated from the software publisher and has not been altered since leaving the software publisher's possession;
   revoking the code-specific digital certificate to prevent relying parties from trusting the code associated with the code-specific digital certificate.

2. The method of claim 1, wherein the metadata identifies at least one of:
   an application name associated with the code;
   a version number associated with the code;
   a content rating associated with the code;
   an application category associated with the code.

3. The method of claim 1, wherein the information that uniquely identifies the code comprises at least one of:
   a copy of the code;
   a digital fingerprint that uniquely identifies the code.

4. The method of claim 1, wherein the code-signing request further comprises a request to prevent at least a portion of the metadata from being included within the code-specific digital certificate.

5. The method of claim 1, wherein the code-signing request further comprises a publisher-defined validity period that specifies a limited period of time that the code-specific digital certificate is to be valid.

6. The method of claim 5, wherein generating the code-specific digital certificate comprises including expiration data within the code-specific digital certificate that specifies that the code-specific digital certificate expires at the end of the publisher-defined validity period.

7. The method of claim 6, wherein the code-specific digital certificate further includes a certificate extension that specifies that relying parties should not ignore the expiration data contained within the code-specific digital certificate, even if an otherwise valid timestamp is present.

8. The method of claim 1, wherein the code-specific digital certificate further includes at least one of:
   information that identifies the software publisher;
   information that identifies an entity responsible for signing the code;
   a checksum of the code;
   a digital signature created using a private key.

9. The method of claim 1, wherein the code-specific digital certificate is revoked in response to a determination that the code-specific digital certificate is invalid.

10. The method of claim 1, wherein revoking the code-specific digital certificate comprises revoking the code-specific digital certificate in response to a revocation request from the software publisher.

11. The method of claim 1, wherein revoking the code-specific digital certificate comprises:
   identifying criteria for identifying at least one digital certificate that is to be revoked;
   determining that at least a portion of the metadata associated with the code-specific digital certificate satisfies the criteria;
   revoking the code-specific digital certificate.

12. A system for generating code-specific code-signing certificates containing extended metadata, the system comprising:
   an intake module programmed to receive a code-signing request from a software publisher to sign code, the code-signing request comprising:
      information that uniquely identifies the code;
      metadata that identifies at least one characteristic of the code;
   a signing module programmed to sign the code by generating a unique, code-specific digital certificate for the code, wherein the code-specific digital certificate is valid only for the code in question and includes at least a portion of the metadata contained within the code-signing request;
   a delivery module programmed to provide the code-specific digital certificate to the software publisher to enable the software publisher to attest that the code originated from the software publisher and has not been altered since leaving the software publisher's possession;
   a revocation module programmed to revoke the code-specific digital certificate to prevent relying parties from trusting the code associated with the code-specific digital certificate;
   at least one processor configured to execute the intake module, the signing module, and the delivery module.

13. The system of claim 12, wherein the metadata identifies at least one of:
   an application name associated with the code;
   a version number associated with the code;
   a content rating associated with the code;
   an application category associated with the code.

14. The system of claim 12, wherein the code-signing request further comprises a request to prevent at least a portion of the metadata from being included within the code-specific digital certificate.

15. The system of claim 12, wherein the code-signing request further comprises a publisher-defined validity period that specifies a limited period of time that the code-specific digital certificate is to be valid.

16. The system of claim 15, wherein the signing module is programmed to generate the code-specific digital certificate by including expiration data within the code-specific digital certificate that specifies that the code-specific digital certificate expires at the end of the publisher-defined validity period.

17. The system of claim 12, wherein the revocation module is programmed to revoke the code-specific digital certificate in response to a determination that the code-specific digital certificate is invalid.

18. The system of claim 12, wherein the revocation module is programmed to revoke the code-specific digital certificate in response to a revocation request from the software publisher.

19. The system of claim 12, wherein the revocation module is programmed to revoke the code-specific digital certificate by:
- identifying criteria for identifying at least one digital certificate that is to be revoked;
- determining that at least a portion of the metadata associated with the code-specific digital certificate satisfies the criteria;
- revoking the code-specific digital certificate.

20. A non-transitory computer-readable-storage medium comprising one or more computer-executable instructions that, when executed by at least one processor of a computing device, cause the computing device to:
- receive a code-signing request from a software publisher to sign code, the code-signing request comprising:
  - information that uniquely identifies the code;
  - metadata that identifies at least one characteristic of the code;
- in response to the code-signing request, sign the code by generating a unique, code-specific digital certificate for the code, wherein the code-specific digital certificate is valid only for the code in question and includes at least a portion of the metadata contained within the code-signing request;
- provide the code-specific digital certificate to the software publisher to enable the software publisher to attest that the code originated from the software publisher and has not been altered since leaving the software publisher's possession;
- revoke the code-specific digital certificate to prevent relying parties from trusting the code associated with the code-specific digital certificate.

* * * * *